J. Longyear,
Boring Wood.

Nº 34,436.        Patented Feb. 18, 1862.

Witnesses.        Inventor.
Jacob Longyear
by Munn & Co. atty.

UNITED STATES PATENT OFFICE.

JACOB LONGYEAR, OF GRASS LAKE, MICHIGAN.

IMPROVED BORING-MACHINE.

Specification forming part of Letters Patent No. 34,436, dated February 18, 1862.

*To all whom it may concern:*

Be it known that I, JACOB LONGYEAR, of Grass Lake, in the county of Jackson and State of Michigan, have invented a new and Improved Boring-Machine, designed more especially for boring blind-stiles and other articles in which it is necessary to have a plurality of holes; and I do hereby declare that the following is a full, clear, and exact description of the same, reference being had to the annexed drawings, making a part of this specification, in which—

Figure 1:
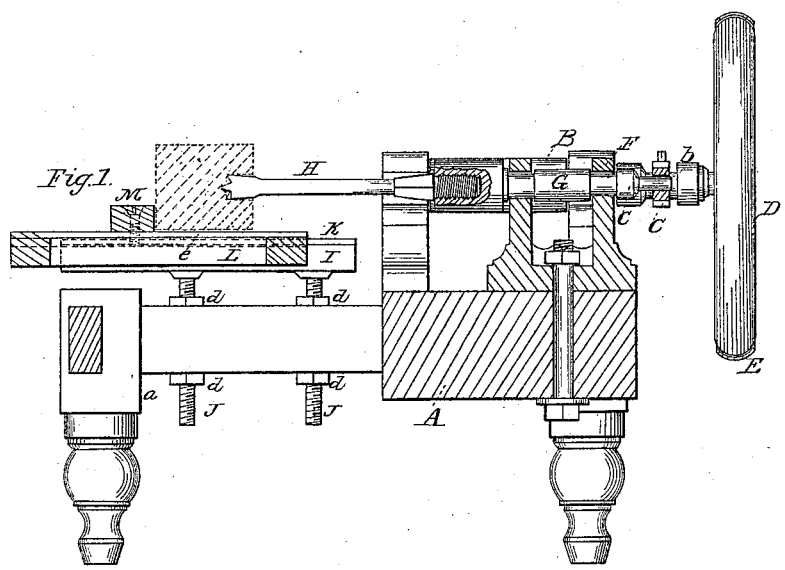
Figure 2:
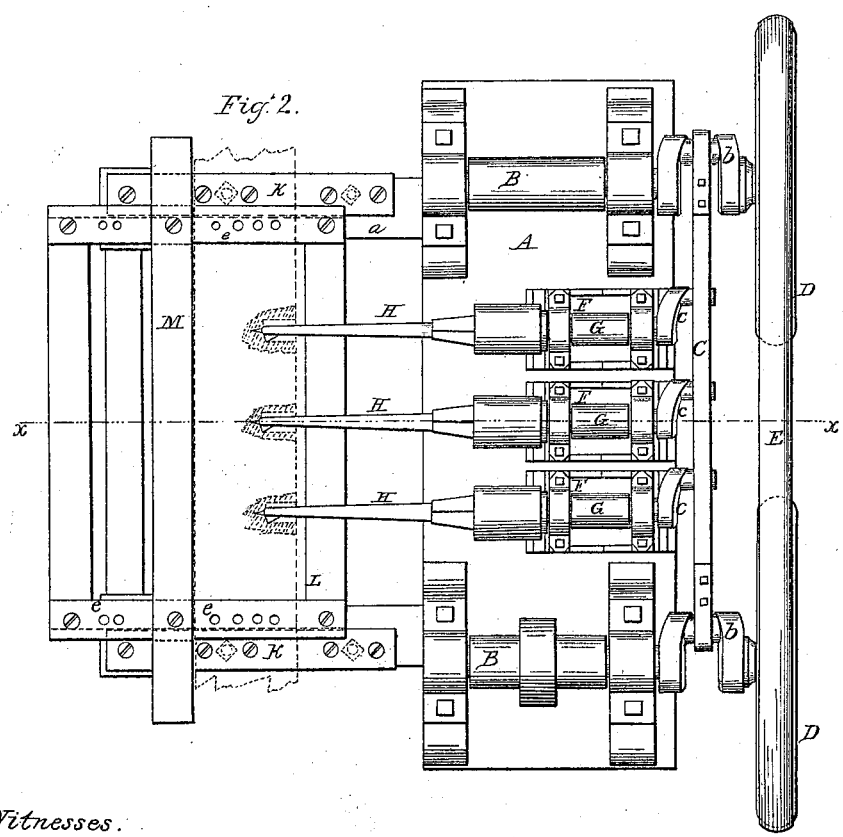

Figure 1 is a side sectional view of my invention, taken in the line $x\ x$, Fig. 2; Fig. 2, a plan or top view of same.

Similar letters of reference indicate corresponding parts in the two figures.

This invention relates to a machine which is designed for boring a number of holes simultaneously or at one operation, such, for instance, as are required in blind-stiles to receive the tenons of the slats.

The object of the invention is to facilitate this kind of work and reduce the cost of construction of the manufactured article by not only expediting the boring operation, but by also dispensing in this department of work with superior mechanics hitherto required.

To enable those skilled in the art to fully understand and construct my invention, I will proceed to describe it.

A represents a platform, which is properly supported by a frame $a$, and has two shafts B B placed upon it, said shafts being parallel with each other and placed one near each end of the bench or platform. Each shaft B has a crank $b$ on it, and these cranks are connected by a bar C, and on the outer end of each shaft B there is placed a wheel D, around which a belt E passes.

On the bench or platform A, between the shafts B B, there are placed a series of heads F, each of which has a mandrel G fitted in it. Each mandrel G has a bit H inserted in its inner end, and at the back end of each mandrel G there is a crank $c$, the pins of which are inserted in the bar C.

From the above description it will be seen that by applying power to either of the wheels D both shafts B B will be rotated and all the mandrels G with the bits H.

I I represent two parallel bars, which are placed one at each side of the frame $a$ on screws J, which pass through the side rails of frame A and are secured in proper position by jaw-nuts. On each bar I there is secured a guide K on which a carriage L is placed and allowed to slide freely back and forth. On this carriage L there is secured a bar M, which is at right angles with the side pieces $e\ e$ of the carriage, and serves as a gage or bearing for the stile or other article to be bored.

The operation will be readily seen. The article to be bored (shown in red outlines) is placed on the carriage L, and the latter is elevated or depressed to the proper height by means of the screws J and nuts $d$. The bars I may be separately adjusted, and thus each end of the carriage may be elevated or depressed independently of the other end, as desired, whereby a series of holes may be simultaneously bored in any part of the stuff upon a parallel line, or upon an angular line, as may be required. The power is then applied to one of the wheels D and the mandrels and bits rotated, the operator shoving the carriage L forward toward the bits H, so that the latter will enter the article to be bored, the bits all operating simultaneously. By operating the several mandrels G, through the medium of the cranks $c$ and the bar C attached to the crank $b$ of the shafts B B, a very simple means attended with but little friction is obtained for effecting the result. Any number of bits H may be employed, the shafts B being placed sufficiently far apart to admit of a bar C of requisite length being used.

Having thus described my invention, what I claim as new, and desire to secure by Letters Patent, is—

The arrangement of the independently-adjustable carriage-bars I I with the carriage L, adjustable stop M, and the series of boring-bits H H H, all as herein shown and described.

JACOB LONGYEAR.

Witnesses:
 SEMEL P. STRYKER,
 G. E. ATKINSON.